US007948544B2

(12) United States Patent
Park et al.

(10) Patent No.: US 7,948,544 B2
(45) Date of Patent: May 24, 2011

(54) CMOS IMAGE SENSOR

(75) Inventors: Ae-Young Park, Chungcheongbuk-do (KR); Chang-Min Bae, Chungcheongbuk-do (KR); Hack-Soo Oh, Chungcheongbuk-do (KR)

(73) Assignee: Crosstek Capital, LLC, Wilmington, DE (US)

( * ) Notice: Subject to any disclaimer, the term of this patent is extended or adjusted under 35 U.S.C. 154(b) by 987 days.

(21) Appl. No.: 11/217,240

(22) Filed: Aug. 31, 2005

(65) Prior Publication Data

US 2006/0044440 A1 Mar. 2, 2006

(30) Foreign Application Priority Data

Aug. 31, 2004 (KR) ........................ 10-2004-0069038
Aug. 31, 2004 (KR) ........................ 10-2004-0069046
Aug. 31, 2004 (KR) ........................ 10-2004-0069218

(51) Int. Cl.
*H04N 5/335* (2006.01)

(52) U.S. Cl. ........................................................ 348/308

(58) Field of Classification Search ................... 348/308
See application file for complete search history.

(56) References Cited

U.S. PATENT DOCUMENTS 5,267,335 A 11/1993 Mita
6,535,247 B1 * 3/2003 Kozlowski et al. ........... 348/241
6,940,551 B2 * 9/2005 Merrill .......................... 348/301
6,977,685 B1 * 12/2005 Acosta-Serafini et al. ... 348/308
7,098,952 B2 * 8/2006 Morris et al. ................. 348/308
7,408,578 B2 * 8/2008 Chapman et al. ............. 348/308
7,480,000 B2 * 1/2009 Oda ............................. 348/321
7,522,199 B2 * 4/2009 Funakoshi et al. ............ 348/245
7,619,669 B2 * 11/2009 Barna et al. ................... 348/283
7,671,912 B2 * 3/2010 Abe et al. ...................... 348/300
2003/0234884 A1 * 12/2003 Nakada ......................... 348/308

FOREIGN PATENT DOCUMENTS

CN 1 239 308 12/1999
CN 1 469 485 1/2004
JP 2004007471 1/2004
JP 2004172950 6/2004

OTHER PUBLICATIONS

Japanese Office Action for Japanese Patent Application No. 2005/252727 (Japanese counterpart to present U.S. application), dated Aug. 31, 2010 (and English translation).

* cited by examiner

*Primary Examiner* — Lin Ye
*Assistant Examiner* — Amy Hsu
(74) *Attorney, Agent, or Firm* — McAndrews, Held & Malloy, Ltd.

(57) ABSTRACT

Disclosed herein is a CMOS image sensor for improving an image quality by removing an offset noise occurred in a path difference. The CMOS image sensor includes a pixel array including a plurality of a first pixel and a second pixel; a first analog data bus and a second analog data bus for transferring a first pixel data and a second pixel data, each generated from the first pixel and the second pixel; a first analog signal processing unit and a second analog signal processing unit, each for amplifying an inputted pixel data to extract a pure pixel data; and a swapping unit for swapping the first pixel data and the second pixel data to thereby delivery each of first and second swapped pixel data into each of the first and the second analog signal processing unit.

36 Claims, 8 Drawing Sheets

ADC out
Clk(2x)
clk_dly_f1
clk_dly_f2
ff1_dly
ff2_dly
OUT_dly
clk_swap_f1
clk_swap_f2
ff1_swap
ff2_swap
pass
OUT_dly
α
β

CMOS IMAGE SENSOR

FIELD OF THE INVENTION

The present invention relates to a complementary metal oxide semiconductor (CMOS) image sensor; and, more particularly, to a CMOS image sensor for improving an image quality by removing an offset noise caused by a path difference.

BACKGROUND OF THE INVENTION

In general, a complementary metal oxide semiconductor (CMOS) image sensor is a semiconductor device that converts an optical image to an electrical signal. The image sensor is basically classified into a charge coupled device (CCD) image sensor and a complementary metal oxide semiconductor (CMOS) image sensor.

Among the image sensors, the CCD image sensor is the semiconductor device that each of metal-oxide-silicon (MOS) capacitors is placed in close proximity and charge carriers are stored in and transferred. The CMOS image sensor adopts a switching method for sequentially detecting outputs of many metal oxide semiconductor (MOS) transistors constituent with the number of pixels based on CMOS technology.

The CMOS image sensor is cheaper than the CCD image sensor and has power consumption as much as 1/10 of that of the CCD image sensor.

A conventional CMOS image sensor which process image data (analog signals) acquired from pixels is described in FIG. 1.

FIG. 1 is a block diagram showing a conventional COMS image sensor. In detail, FIG. 1 describes a data path transmitting an analog data generated a pixel array in the conventional COMS image sensor.

As shown in FIG. 1, the conventional CMOS image sensor includes a pixel array 10, a correlated double sampling (CDS) block 20 and an analog signal processor (ASP) 30. The pixel array includes plural red (R), green (G) and blue (B) pixels arranged in an M×N matrix. The correlated double sampling (CDS) block 20 including CDS circuits at each column is located at a lower side of the pixel array 10. The analog signal processor (ASP) 30 processing the analog signals outputted from the CDS block 20 is located at a right side of the pixel array 10.

The output signals of the CDS block 20 are transferred to the ASP 30 through an analog data bus. The analog data bus is constituent with a first analog data bus 52 and a second analog data bus 54.

The output signals of the CDS block 20 are loaded on the first analog data bus 52 or the second analog data bus 54 by a selecting block 60 which is controlled by a select signal, e.g., CS0, generated from a column driver 40. The selecting block 60 includes plural switches for selectively delivery the outputs of CDS block 20 into one of the first analog data bus 52 or the second analog data bus 54.

The ASP 30 has an ASP-A 32 and an ASP-B 34 to amplify each analog data transferred through the first analog data bus 52 and the second analog data bus 54.

The CDS block 20 samples a reset signal and a data signal from each pixel and supplies the sampled reset and data signals on the analog data bus. Then, the ASP 30 calculates a difference between the reset signal and the data signal and amplifies the difference. Accordingly, an analog pixel data of a captured object can be obtained.

Further, the column driver 40 receives a column address to thereby generate the select signals, e.g., CS0.

Hereinafter, the process of the CMOS image sensor is described as follows.

When the CMOS image sensor reads pixel data, the pixels arranged along one row of the pixel array 10 are transferred to the CDS circuits of the CDS block 20 at once and at the same time (at the same clock). Under the control of a column driver 40, output signals of the CDS circuits are loaded on one of the first analog data bus 52 and the second analog data bus 54 by a selecting block 60 and are sequentially transferred to the ASP 30.

For example, a sequence that pixel data generated from a first row and a second row in the pixel array 10 are loaded on the first analog data bus 52 and the second analog data bus 54 is as the following Table 1.

TABLE 1

| | The first row | | | | The second row | | | |
|---|---|---|---|---|---|---|---|---|
| The first analog data bus | $B_{11}$ | $B_{13}$ | $B_{15}$ | ... | $G_{21}$ | $G_{23}$ | $G_{25}$ | ... |
| The second analog data bus | $G_{12}$ | $G_{14}$ | $G_{16}$ | ... | $R_{22}$ | $R_{24}$ | $R_{26}$ | ... |

Referring to Table 1, among pixel data located at the same row, pixel data corresponding to every odd column line are loaded on the first analog data bus and pixel data corresponding to every even column line are loaded on the second analog data bus.

In detail, even the same green (G) pixel data pass through the path A on the first analog data bus or the path B on the second analog data bus according to the located column line. Also, the Red (R) and Blue (B) pixel data pass through the path A or path B according to the located column. That is, pixel data are transmitted through different paths according to pixel location, not a type of pixel. Thus, even the same type pixel data have an offset because of passing through the different paths.

As above described, if the offset occurs because of a path difference, an offset noise appears in a real image to thereby deteriorate an image quality.

SUMMARY OF THE INVENTION

It is, therefore, an object of the present invention to provide a CMOS image sensor for improving an image quality by removing an offset noise caused by a difference between paths which same type pixel data go through.

In an aspect of the present invention, there is provided a CMOS image sensor, including: a pixel array including a plurality of a first pixel and a second pixel; a first analog data bus and a second analog data bus for transferring a first pixel data and a second pixel data, each generated from the first pixel and the second pixel; a first analog signal processing unit and a second analog signal processing unit, each for amplifying an inputted pixel data to extract a pure pixel data; and a swapping unit for swapping the first pixel data and the second pixel data to thereby delivery each of first and second swapped pixel data into each of the first and the second analog signal processing unit.

In accordance with another aspect of the present invention, there is provided an apparatus for converting image data into electric signals, including: a pixel array including a plurality of a first pixel and a second pixel; a first analog data bus and a second analog data bus for transferring a first pixel data and a second pixel data, each generated from the first pixel and the second pixel; a first analog signal processing unit and a second analog signal processing unit, each for amplifying an inputted pixel data to extract a pure pixel data; and a swapping unit for swapping the first pixel data and the second pixel data to thereby delivery each of first and second swapped pixel data into each of the first and the second analog signal processing unit.

In accordance with another aspect of the present invention, there is provided a method for processing a pixel data in an apparatus for converting image data into electric signals, including the steps of: loading a first pixel data and a second pixel data, each generated from the first pixel and the second pixel, on the first analog data bus and the second analog data bus; swapping the first pixel data and the second pixel data to thereby delivery each of first and second swapped pixel data into each of a first and a second analog signal processing unit; and amplifying the pixel data transferred to the first analog signal processing unit and the second analog signal processing unit.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, a CMOS image sensor in accordance with the present invention will be described in detail referring to the accompanying drawings.

Figure 1:
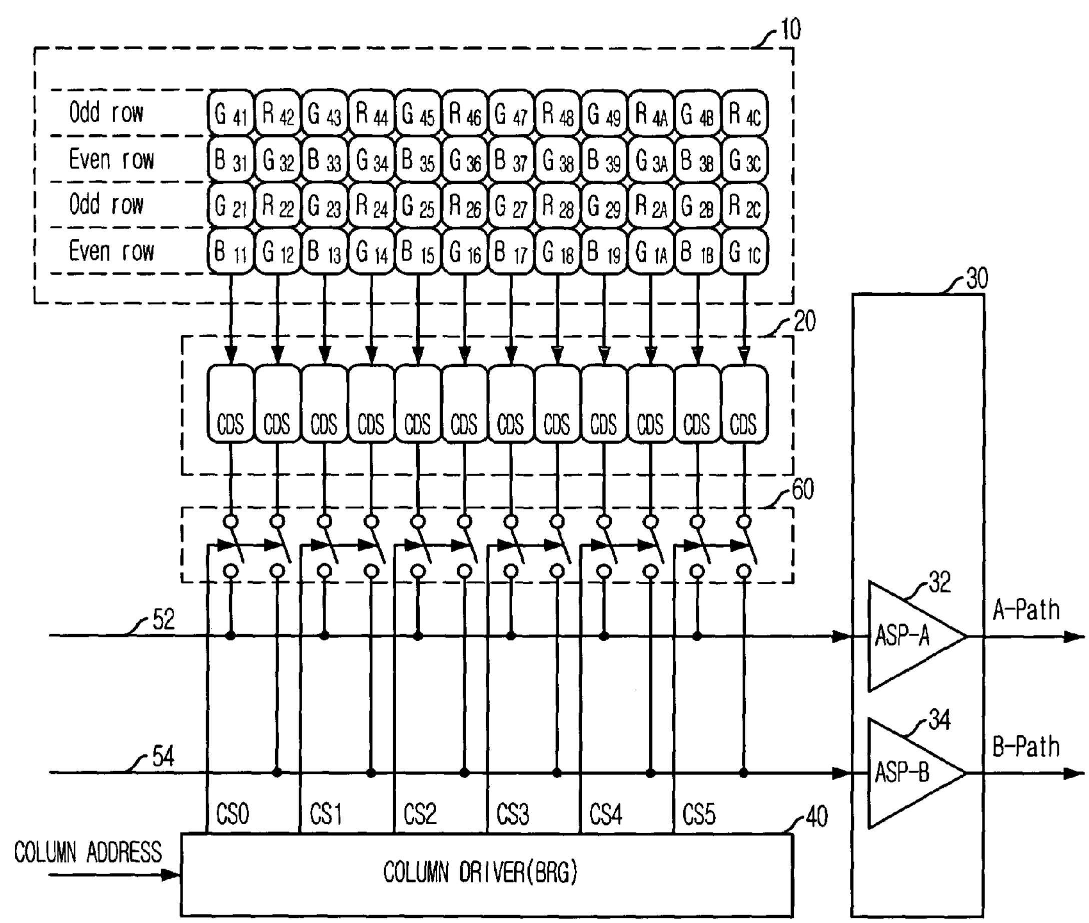
FIG. 1 is a block diagram showing a conventional COMS image sensor.
Figure 2:
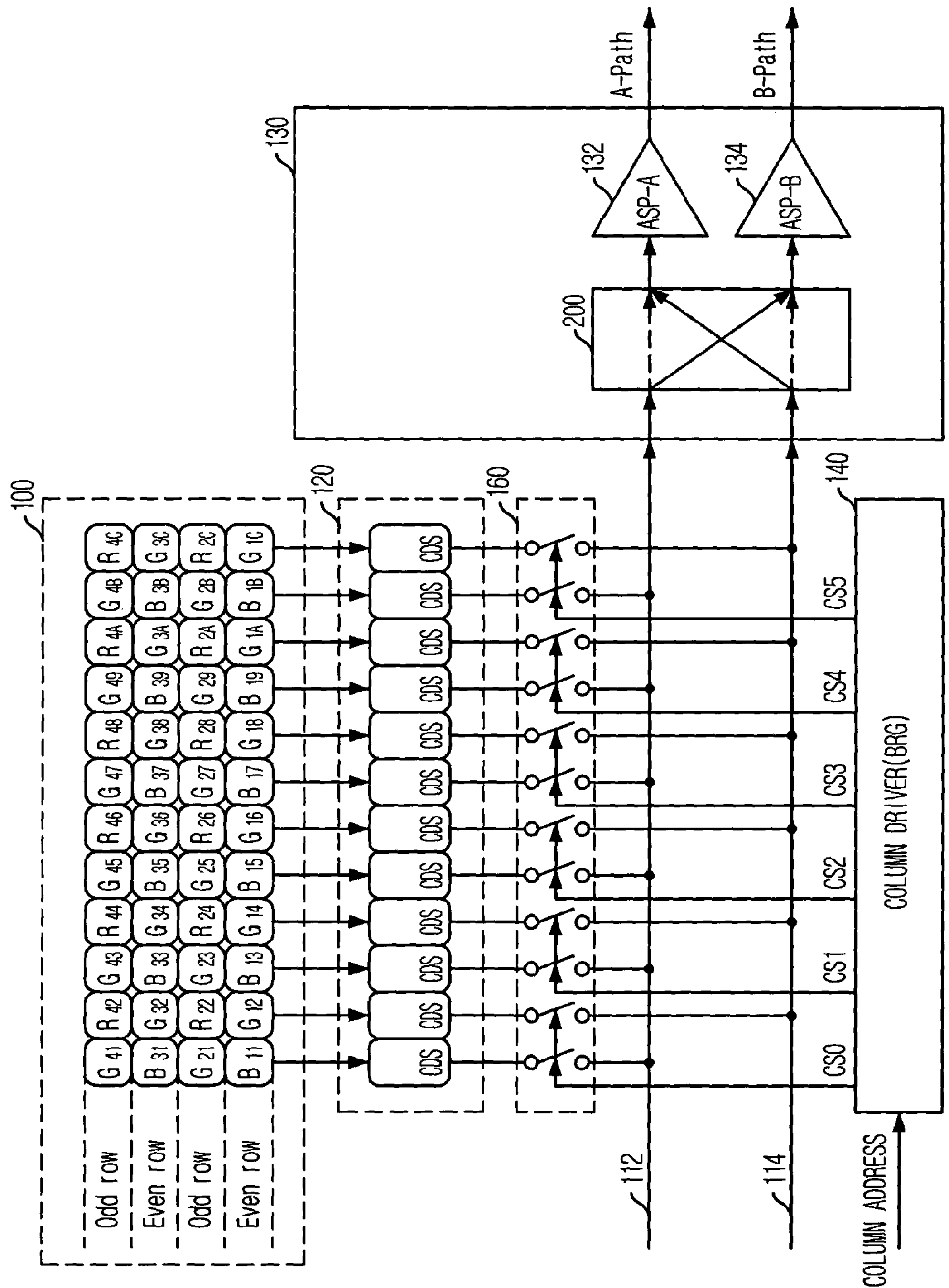
FIG. 2 is a block diagram describing a CMOS image sensor in accordance with an embodiment of the present invention.

FIG. 2 is a block diagram describing a CMOS image sensor in accordance with an embodiment of the present invention.

As shown in FIG. 2, the CMOS image sensor of the present invention includes a first analog data bus 112 and a second analog data bus 114 in order to transfer pixel data. Also, the CMOS image sensor includes a pixel array 100, a correlated double sampling (CDS) block 120 and an analog signal processor (ASP) 130. The pixel array includes plural red (R), green (G) and blue (B) pixels arranged in an M×N matrix. The correlated double sampling (CDS) block 120 including CDS circuits at each column is located at a lower side of the pixel array 100. The analog signal processor (ASP) 130 processing the analog signals outputted from the CDS block 120 is located at a right side of the pixel array 100.

The output signals of the CDS block 120 are loaded on the first analog data bus 112 or the second analog data bus 114 by a selecting block 160, which is controlled by a select signal (CS0, CS1, CS2 . . . ) generated from a column driver 140.

Particularly, the ASP 130 includes a swapping block 200 and amplifying blocks ASP-A 132 and an ASP-B 134 to amplify output signals of the swapping block 200. The swapping block 200 swaps the pixel data so that same type pixel data among the pixel data transferred through the first analog data bus 112 and the second analog data bus 114 pass through a same path.

Figure 3A:
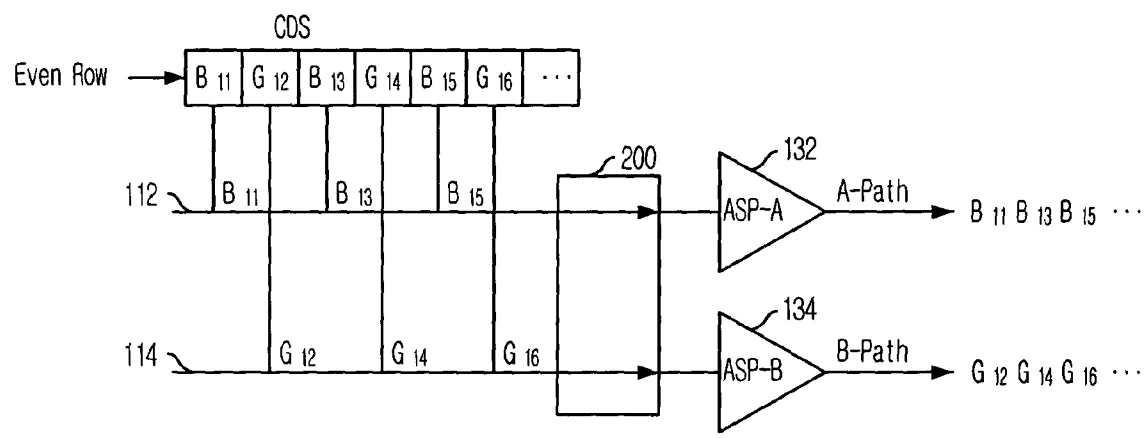
FIG. 3A and FIG. 3B are block diagrams illustrating an operation of a swapping block in accordance with the present invention.
Figure 3B:
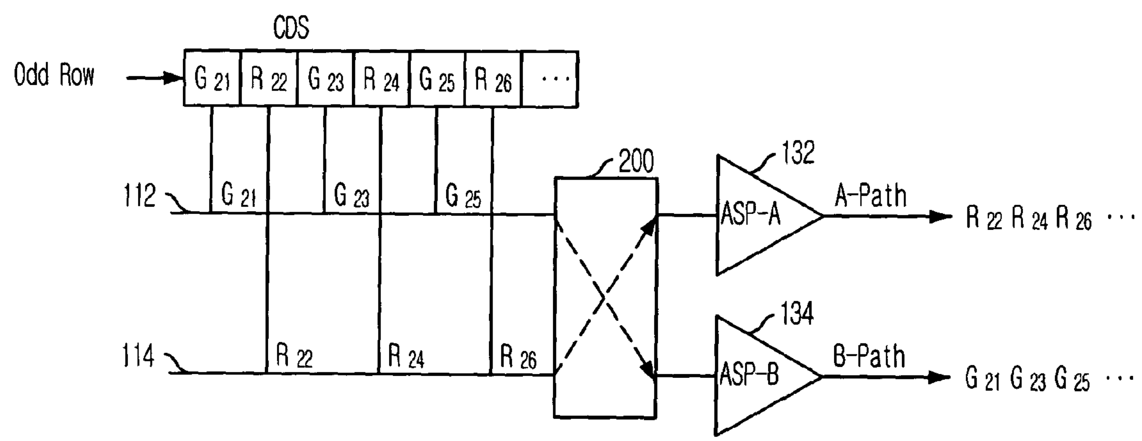

FIG. 3A and FIG. 3B are block diagrams illustrating an operation of a swapping block in accordance with the present invention.

Hereinafter, an operation of the ASP 130 included in the CMOS image sensor according to the present invention is described referring to FIG. 3A and FIG. 3B.

First, FIG. 3A shows the case that the swapping block 200 passes pixel data located at the first row, which are loaded on the first analog data bus 112 and the second analog data bus 114.

The CDS block 120 samples and saves the pixel data located at the first row, e.g., "$B_{11}$, $G_{12}$, $B_{13}$, $G_{14}$, $B_{15}$, $G_{16}$ . . . ". Then, the pixel data at the same row and every odd column, i.e., "$B_{11}$, $B_{13}$, $B_{15}$ . . . ", are loaded on the first analog data bus 112 by a selecting block. Also, the pixel data located at the same row and every even column, i.e., "$G_{12}$, $G_{14}$, $G_{16}$ . . . ", are loaded on the second analog data bus 114 by the selecting block. Continuously, the swapping block 200 passes the pixel data on the first analog data bus 112 and the second analog data bus 114. That is, the pixel data at the same row and every odd column are transferred to A-path through the ASP-A 132 and the pixel data at the same row and every even column are transferred to B-path through the ASP-B 134. Accordingly, the blue (B) pixel data at the first row, i.e., "$B_{11}$, $B_{13}$, $B_{15}$ . . . ", go through A-path, and the green (G) pixel data at the first row, i.e., "$G_{12}$, $G_{14}$, $G_{16}$ . . . ", go through B-path. A pixel data sequence can be briefly described as the following Table 2.

TABLE 2

| | The first row | | | | The second row | | | |
|---|---|---|---|---|---|---|---|---|
| A-Path | $B_{11}$ | $B_{13}$ | $B_{15}$ | . . . | $R_{22}$ | $R_{24}$ | $R_{26}$ | . . . |
| B-Path | $G_{12}$ | $G_{14}$ | $G_{16}$ | . . . | $G_{21}$ | $G_{23}$ | $G_{25}$ | . . . |

FIG. 3B shows the case that the swapping block 200 swaps pixel data at the second row, which are loaded on the first analog data bus 112 and the second analog data bus 114.

Referring to FIG. 3B, the swapping block 200 swaps the green (G) pixel data loaded on the first analog data bus 112, i.e., "$G_{21}$, $G_{23}$, $G_{25}$ . . . ", for the red (R) pixel data loaded on the second analog data bus 114, i.e., "$R_{22}$, $R_{24}$, $R_{26}$ . . . ". So, the outputs of the swapping block 200 are crossed and outputted. Continuously, each output of the swapping block 200 is transferred to A-path or B-path through the ASP-A 132 or ASP-B 134. As can be seen the second row in Table 2, the red (R) pixel data at the second row, i.e., "$R_{22}$, $R_{24}$, $R_{26}$ . . . ", go through A-path, and the green (G) pixel data at the second row, i.e., "$G_{21}$, $G_{23}$, $G_{25}$ . . . ", go through B-path.

As described above, the ASP 130 of the present invention has the swapping block 200 which passes the pixel data located at the every even row and swaps the pixel data located at the every odd row. Therefore, the red (R) pixel data and the blue (B) pixel data go through A-path and the green (G) pixel data go through B-path.

Consequently, in the present invention, the CMOS image sensor having the swapping block 200 which makes all green (G) type pixel data go through the same path. It is well known by people skilled in the art that the green (G) pixel data is an important factor determining a luminance, a brightness, chroma, etc. That is, the CMOS image sensor improves an image quality by removing the offset noise caused by the path difference e.g., green (G) type pixel data go through different paths.

Hereinafter, when the same type pixel data are transferred through the same path by the swapping block 200, rearrangement methods for preventing input and output data of ASP block from confusing a sequence of original pixel data are described.

B-path. Accordingly, pixel data $B_{11}$ loaded on the A-path is outputted, and then, pixel data $G_{12}$ loaded on the B-path is outputted.

Next, in case of 'β', since the swap control signal swp_ctr is logic level 'H', the de-multiplexer 210 outputs pixel data, in turns, as a sequence from data on the B-path to data on the A-path. Accordingly, pixel data $G_{21}$ loaded on the B-path are outputted, and then pixel data $R_{22}$ loaded on the A-path is outputted.

As described above, the sequence of the pixel data outputted by the de-multiplexer 210 is shown as the following Table 3.

TABLE 3

| | The case of 'α' (The first row) | | | | | | | The case of 'β' (The second row) | | | | | | |
|---|---|---|---|---|---|---|---|---|---|---|---|---|---|---|
| De-multiplexer | $B_{11}$ | $G_{12}$ | $B_{13}$ | $G_{14}$ | $B_{15}$ | $G_{16}$ | ... | $G_{21}$ | $R_{22}$ | $G_{23}$ | $R_{24}$ | $G_{25}$ | $R_{26}$ | ... |

Figure 4:
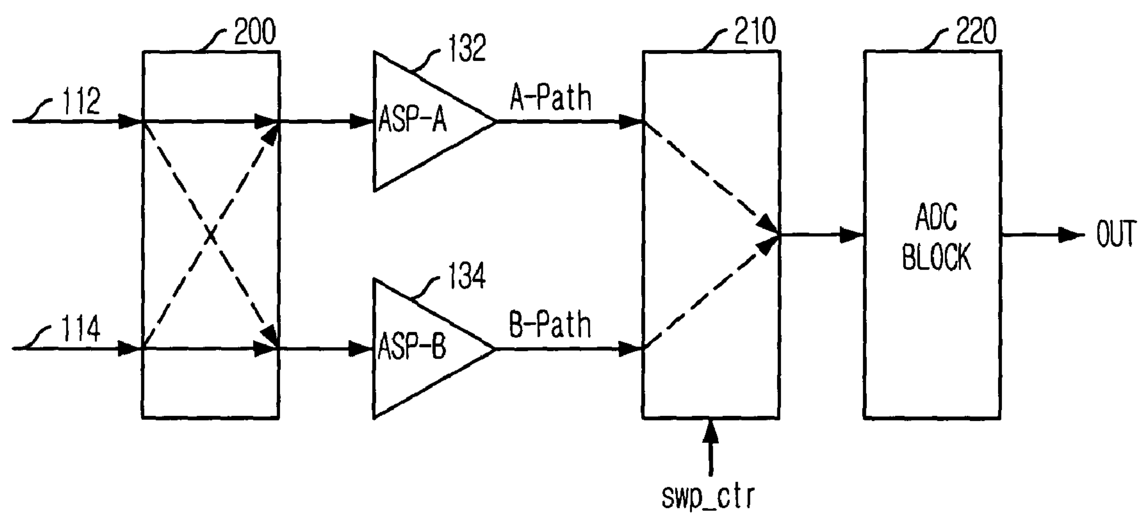
FIG. 4 is a block diagram showing an ASP block in accordance with another embodiment of the present invention.

FIG. 4 is a block diagram showing an ASP block in accordance with another embodiment of the present invention.

As shown in FIG. 4, the ASP block 130 according to the present invention includes the first analog data bus 112 and the second analog data bus 114 in order to transfer pixel data. Also, the ASP block 130 includes a swapping block 200, amplifying blocks ASP-A 132 and an ASP-B 134, a de-multiplexer 210 and an analog to digital converter (ADC) block 220. The swapping block 200 makes the same type of pixel data, which is transferred to the first analog data bus 112 and the second analog data bus 114, go through the same path. The amplifying blocks ASP-A 132 and an ASP-B 134 amplify output signals of the swapping block 200 and put the output signals on A-path and B-path. The de-multiplexer 210 outputs the pixel data of A-path and B-path to only one output line in turns; also, makes a sequence of the pixel data swapped by the swapping block 200 as that of an original image in response to a swap control signal swp_ctr. The ADC block 220 is for converting the output data of the de-multiplexer 210 into digital signals (OUT).

Referring to FIG. 3A and FIG. 3B, the swapping block 200 makes the red (R) pixel data and the blue (B) pixel data go through A-path and the green (G) pixel data go through B-path by passing the pixel data corresponding to the every even row and swapping the pixel data corresponding to the every odd row.

The de-multiplexer 210 outputs the pixel data from A-path and B-path to only one output line and adjusts the output sequence in response to the swap control signal swp_ctr.

Figure 5:
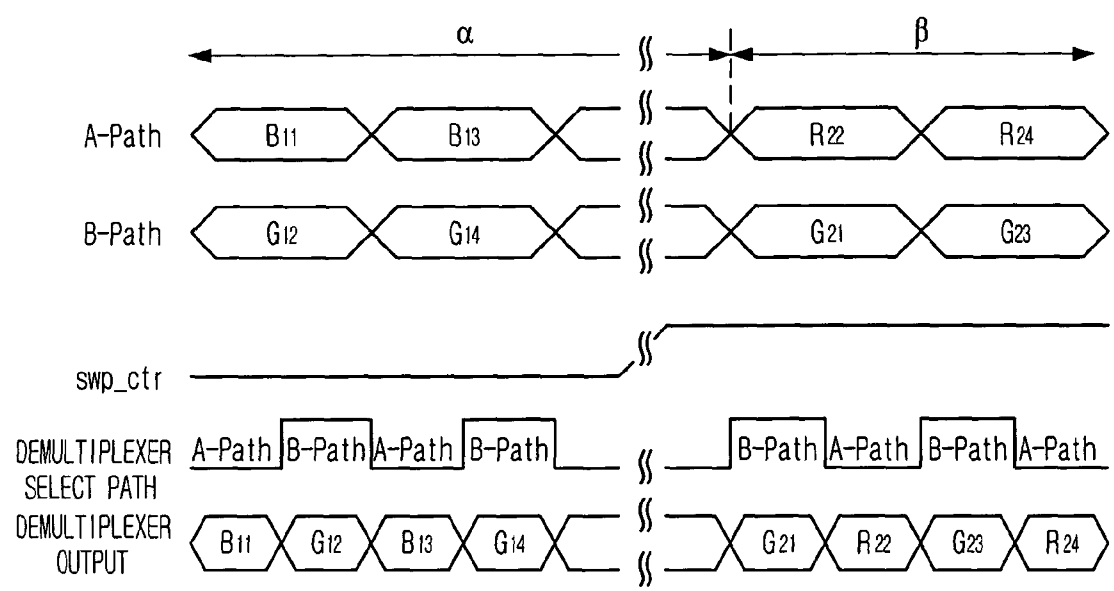
FIG. 5 is a waveform demonstrating an operation of a de-multiplexer shown in FIG. 4.

FIG. 5 is a waveform demonstrating an operation of a de-multiplexer 210.

Hereinafter, with reference to the drawings, the de-multiplexer 210 of the present invention will be explained in detail.

In FIG. 5, 'a de-multiplexer select path signal' according to the swap control signal swp_ctr and 'de-multiplexer output' according to the de-multiplexer select path signal are provided.

In case of 'α', the pixel data at the first row are loaded on the A-path and B-path; and, in case of 'β', the pixel data at the second row are loaded on the A-path and B-path.

First, in case of 'α', since the swap control signal swp_ctr is a logic level 'L', the de-multiplexer 210 outputs pixel data, in turns, as a sequence from data on the A-path to data on the B-path.

Referring to Table 3, the de-multiplexer 210 rearranges the sequence of the pixel data swapped by the swapping block 200 and outputs the rearranged pixel data.

Therefore, to remove the offset noise caused by the path difference of the same type pixel data, e.g., a green (G) type pixel data, the CMOS image sensor of the present invention has the swapping block 200 which makes the same type pixel data go through the same path. Also, the de-multiplexer 210 returns the swapped sequence of the pixel data to the sequence of the original image data.

Figure 6:
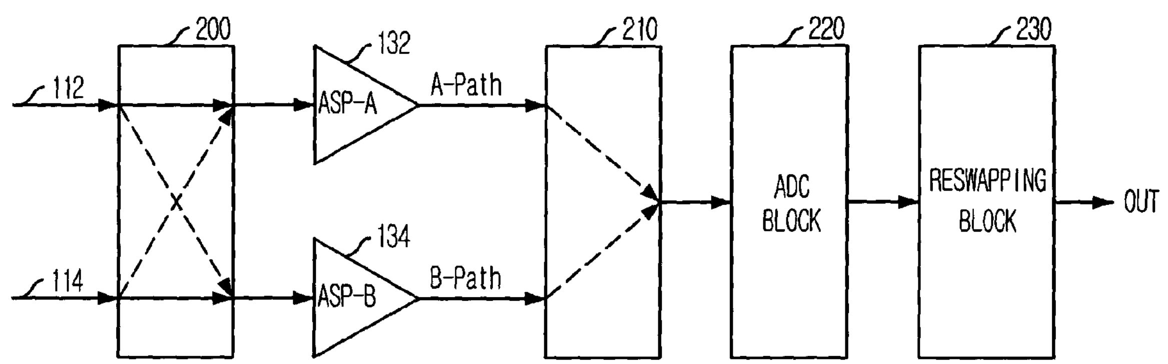
FIG. 6 is a block diagram depicting an ASP block in accordance with another embodiment of the present invention.

FIG. 6 is a block diagram depicting an ASP block in accordance with another embodiment of the present invention.

Referring to FIG. 6, the ASP block according to the present invention includes the first analog data bus 112 and the second analog data bus 114 to transfer pixel data. Also, the ASP block 130 includes a swapping block 200, amplifying blocks ASP-A 132 and an ASP-B 134, a de-multiplexer 210 and a re-swapping block 230. The swapping block 200 makes green (G) pixel data, among the pixel data transferred to the first analog data bus 112 and the second analog data bus 114, go through the same path. The amplifying blocks ASP-A 132 and an ASP-B 134 amplify output signals of the swapping block 200 and put the output signals on A-path and B-path. The de-multiplexer 210 outputs pixel data of A-path and B-path to only one output line in turns, regardless of a sequence of an original image. The ADC block 220 converts the output data of the de-multiplexer 210 to digital signals. Also, the re-swapping block 230 is for outputting the same sequence of the pixel data as that of the pixel array by re-swapping output digital signals of the ADC block 220.

The process of the CMOS image sensor is described as follows.

Referring to FIG. 3A and FIG. 3B, the swapping block 200 makes red (R) pixel data and blue (B) pixel data go through A-path and green (G) pixel data go through B-path by passing the pixel data corresponding to every even row and swapping the pixel data corresponding to every odd row.

Then, the de-multiplexer 210 outputs the pixel data of A-path and B-path to only one output line in turns. The output pixel data of the de-multiplexer 210 are explained as the following Table 4.

TABLE 4

| | The first row | | | | | | | The second row | | | | | | |
|---|---|---|---|---|---|---|---|---|---|---|---|---|---|---|
| De-multiplexer | $B_{11}$ | $G_{12}$ | $B_{13}$ | $G_{14}$ | $B_{15}$ | $G_{16}$ | ... | $R_{22}$ | $G_{21}$ | $R_{24}$ | $G_{23}$ | $R_{26}$ | $G_{25}$ | ... |

As shown in Table 4, the pixel data located at the second row are outputted in sequence of "$R_{22}$, $G_{21}$, $R_{24}$, $G_{23}$, $R_{26}$, $G_{25}$ . . . ". The above output sequence is different from a sequence of the pixel array in the matrix, i.e. the red (R) pixel data are outputted before the green (G) pixel data are outputted.

That is, because the swapping block 200 swaps the pixel data in order to make the green (G) pixel data go through the same path, a re-swapping process is needed so as to output the same sequence of the swapped pixel data as the sequence of the pixel array.

On the other hand, the output signals of the de-multiplexer 210 are converted to digital signals by the ADC block 220. The ADC block 220 maintains the sequence of the output signals of the de-multiplexer 210 because the ADC block 220 outputs the output signals as a sequence of input data.

The re-swapping block 230 re-swaps the output signals of the ADC block 220 correspond to the pixel data swapped by the swapping block 200 and outputs the signals as the sequence of the pixel array.

That is the re-swapping block 230 passes the signals corresponding to the pixel data which are located at the first row, and so do not swapped by the swapping block 200. Also, the re-swapping block 230 swaps the signals corresponding to the pixel data at every even column for the signals corresponding to the pixel data at every odd column, among the signals corresponding to the pixel data at the second row.

For example, the re-swapping block 230 holds pixel data $R_{22}$ at the second column and outputs pixel data $G_{21}$ at the first column. Then, the re-swapping block 230 outputs pixel data $R_{22}$ at the second column. In this way, the re-swapped pixel data are shown in Table 5, as follows.

delay clock clk_dly_f2 and a second swapping clock clk_swap_f2 in response to the swap control signal swp_ctr and provides the selected clock for the second F/F 152. The control signal generating block 156 generates a control signal ctr from the swap control signal swp_ctr and a pass control signal ps_ctr. The third de-multiplexer 153 selects between the input signal and the output signal of the second F/F 152 in response to the control signal ctr and outputs the selected signal (OUT).

The control signal generating block 156 includes an AND gate whose inputs include the swap control signal swp_ctr and the pass control signal ps_ctr.

Figure 7:
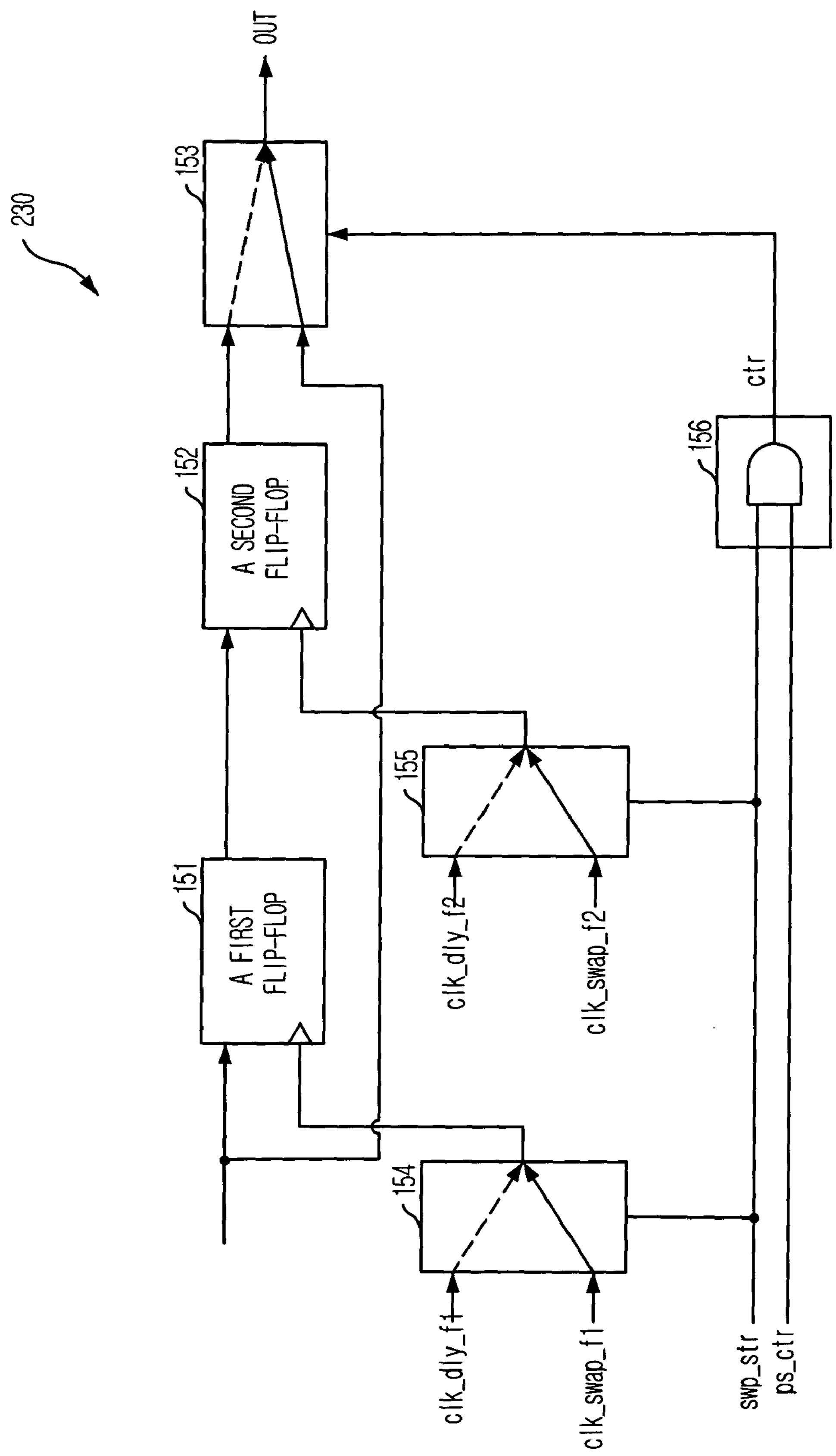
FIG. 7 is a block diagram showing a re-swapping block shown in FIG. 6.
Figure 8:
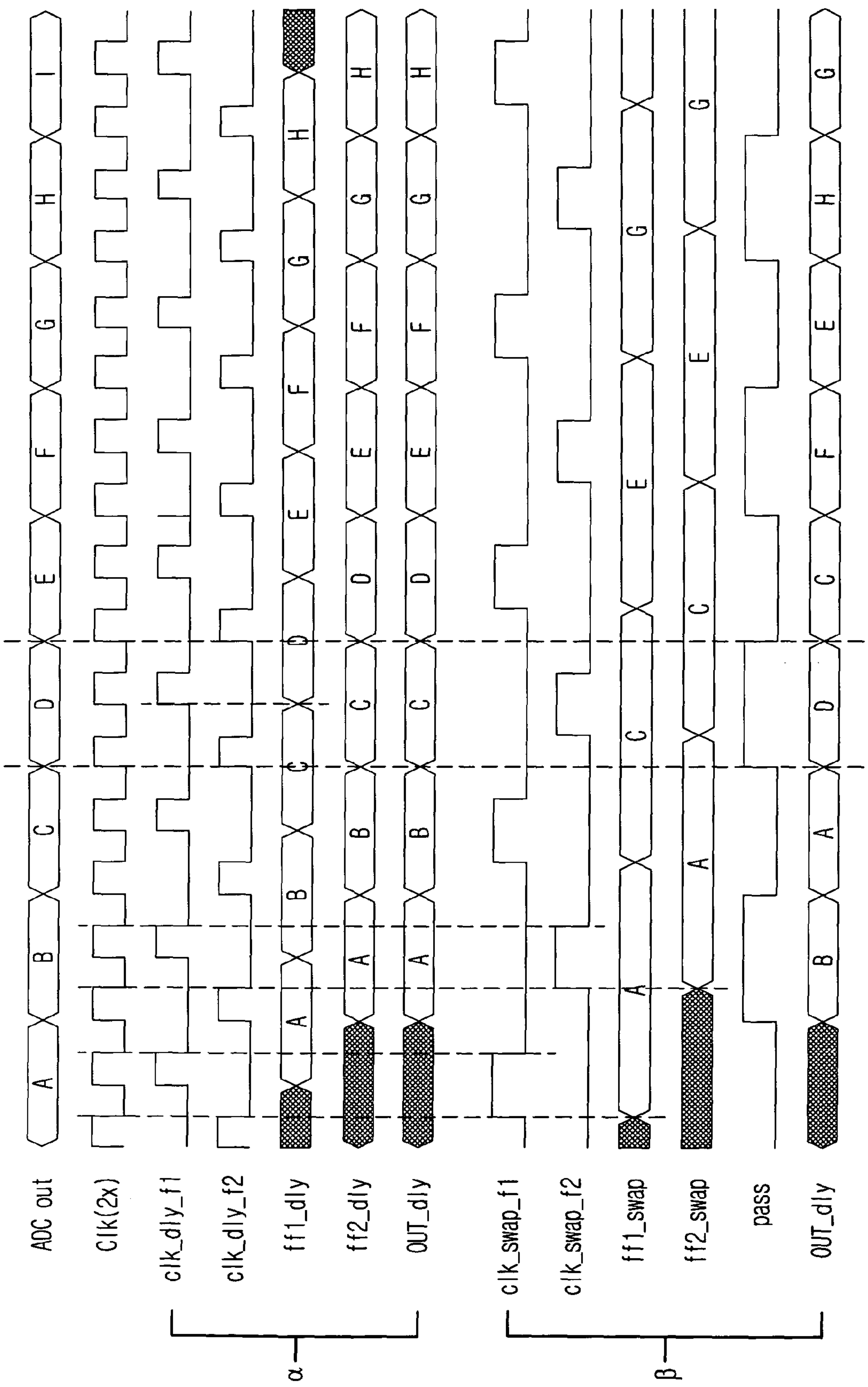
FIG. 8 is a waveform illustrating an operating of the re-swapping block shown in FIG. 7.

FIG. 8 is a waveform illustrating an operating of the re-swapping block 230 shown in FIG. 7.

As shown in FIG. 8, input signals of the re-swapping block 230 is "A, B, C, D, E, F, G, H, I".

In case of 'α', the re-swapping block 230 passes the input signals. The first de-multiplexer 154 selects the first delay clock clk_dly_f1 and provides the first delay clock clk_dly_f1 for the first F/F 151. Also, the second de-multiplexer 155 selects the second delay clock clk_dly_f2 and provides the delay clock clk_dly_f2 for the second F/F 152. Then, the first F/F 151 outputs ff1_dly according to the first delay clock clk_dly_f1 and the second F/F 152 outputs ff2_dly according to the second delay clock clk_dly_f2. The third de-multiplexer 153 passes the output signals of the second F/F 152 according to the control signal ctr. Therefore, output signals (OUT) of the third de-multiplexer 153 are the same sequence as that of input signals.

In case of 'β', the re-swapping block 230 swaps the input signals at every odd number for the input signals at every even number. Hence, the sequence of output signals from the re-swapping block 230 is "B, A, D, C, F, E, H, G".

TABLE 5

| | The first row | | | | | | | The second row | | | | | | |
|---|---|---|---|---|---|---|---|---|---|---|---|---|---|---|
| Re-swapping block | $B_{11}$ | $G_{12}$ | $B_{13}$ | $G_{14}$ | $B_{15}$ | $G_{16}$ | ... | $G_{21}$ | $R_{22}$ | $G_{23}$ | $R_{24}$ | $G_{25}$ | $R_{26}$ | ... |

As shown in Table 5, the ASP block 130 of this invention has the re-swapping block 230 which re-swaps the sequence of the pixel data swapped by the swapping block 200. so, it is possible to reconstruct the original pixel image.

Hereinafter, an embodiment of said re-swapping block 230 is shown in FIG. 7 and FIG. 8.

FIG. 7 is a block diagram showing a re-swapping block 230 shown in FIG. 6.

Referring to FIG. 7, the re-swapping block 230 includes a first flip-flop (F/F) 151 to output an input signal synchronized with a clock and a second F/F 152 to output output signals of the first F/F 151 synchronized with the clock. Also, the re-swapping block 230 includes a first de-multiplexer 154, a second de-multiplexer 155, a control signal generating block 156 and a third de-multiplexer 153. The first de-multiplexer 154 selects between a first delay clock clk_dly_f1 and a first swapping clock clk_swap_f1 in response to a swap control signal swp_ctr and provides the selected clock for the first F/F 151. The second de-multiplexer 155 selects between a second First, the first de-multiplexer 154 and the second de-multiplexer 155 select the first swap clock clk_swap_f1 and the second swap clock clk_swap_f2 and provide the selected swap clock for the first F/F 151 and the second F/F 152, respectively. Then, the first F/F 151 outputs the input signal "A" with synchronizing the first swap clock clk_swap_f1, and the second F/F 152 outputs the output signal "A" of the first F/F 151 with synchronizing the second swap clock clk_swap_f2. While the second F/F 152 holds the output signal of the first F/F 151, the signal "B" is the present input signal.

According as the pass control signal ps_ctr is toggled, the control signal generating block 156 toggles the control signal ctr. Consequently, for an active section of the pass control signal ps_ctr, the present input signal "B" is outputted by the control signal ctr. Also, for an inactive section of the pass control signal ps_ctr, the holding signal "A" of the second F/F 152 is outputted by the control signal ctr.

That is, the flip-flops hold the input signals at every odd number and output the input signals at every even number at once. After outputting the input signals at every even number, the holding input signals at every odd number are outputted.

As described above, the sequence of output signals of the re-swapping block 230 is "B, A, D, C, F, E, H, G" because said re-swapping block 230 swaps the input signals at every odd number for the input signals at every even number.

Therefore, to remove the offset noise caused by the path difference of the same type pixel data, the CMOS image sensor of the present invention has the swapping block 200 for making the same type pixel data go through the same path. In addition, because of said swapping, a sequence of the output signals of the ADC block 220 is different from that of the pixel array. To solve this problem, the re-swapping block 230 which outputs the same sequence of the pixel data as that of the pixel array by re-swapping is provided.

As described above, the CMOS image sensor improves an image quality by removing an offset noise caused by the path difference throughout a swapping operation and a de-swapping operation.

The present application contains subject matter related to Korean patent application Nos. 2004-69038, 2004-69046 and 2004-69218, filed in the Korean Patent Office on Aug. 31, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A complementary metal-oxide semiconductor (CMOS) image sensor, comprising:
- a pixel array including a plurality of first and second pixels;
- a first analog data bus and a second analog data bus both configured to transfer first pixel data generated from the first pixels and second pixel data generated from the second pixels;
- a first analog signal processor and a second analog signal processor both configured to amplify input pixel data to extract pure pixel data;
- a swapping block configured to swap the first pixel data and the second pixel data to thereby deliver first and second swapped pixel data into the first and the second analog signal processors;
- a correlated double-sampling block configured to sample and output pixel data generated from each of the first and second pixels in the pixel array;
- a column driver configured to generate a column select signal;
- a single select block configured to transfer the output signals of the correlated double-sampling block to the first analog data bus and the second analog data bus in response to the column select signal, wherein the single select block is further configured to transfer all pixel data generated from the first and second pixels; and
- a de-multiplexer configured to output the first pixel data and the second pixel data located at a first column in a regular sequence, and output the first pixel data and the second pixel data located at a second column in an opposite sequence.

2. The CMOS image sensor of claim 1, wherein the swapping block is further configured to,
- pass pixel data transferred by the first analog data bus and the second analog data bus if the first pixel data is transferred by the second analog data bus; and
- swap pixel data transferred by the first analog data bus and the second analog data bus if the first pixel data is transferred by the first analog data bus.

3. The CMOS image sensor of claim 1, wherein each of the first pixels is configured to sense the green trait of light and each of the second pixels is configured to sense the red and blue traits of light.

4. The CMOS image sensor of claim 1, wherein each of the first pixels is configured to sense at least one of brightness, luminance, or chroma traits of light, and wherein each of the second pixels is configured to sense at least one other of brightness, luminance, or chroma traits of light.

5. The CMOS image sensor of claim 1,
- wherein the de-multiplexer is configured to output, in turns, the output data of the first analog signal processor and the second analog signal processor to only one output line, and further comprising:
- an analog-to-digital converter block configured to convert the output data of the de-multiplexer into digital signals;
- wherein the de-multiplexer is further configured to make a sequence of the pixel data swapped by the swapping block as a sequence of an original image in response to an input swap control signal.

6. The CMOS image sensor of claim 1,
- wherein the de-multiplexer is configured to output, in turns, the output data of the first analog signal processor and the second analog signal processor to only one output line, and further comprising:
- an analog-to-digital converter block configured to convert the output data of the de-multiplexer into digital signals; and
- a re-swapping block configured to re-swap the output signals of the analog-to-digital converter block corresponding to the pixel data which is swapped by the swapping block.

7. The CMOS image sensor of claim 6, wherein the re-swapping block comprises:
- a first flip-flop configured to output input signals synchronized with a clock;
- a second flip-flop configured to output the output signals of the first flip-flop synchronized with another clock;
- a first de-multiplexer configured to select between a first delay clock and a first swapping clock in response to a swap control signal to thereby provide the selected clock for the first flip-flop;
- a second de-multiplexer configured to select between a second delay clock and a second swapping clock in response to the swap control signal to thereby provide the selected other clock for the second flip-flop;
- a control signal-generating block configured to generate a control signal from the swap control signal and a pass control signal; and
- a third de-multiplexer configured to select between the input signals and the output signals of the second flip-flop in response to the control signal to thereby output the selected signal.

8. The CMOS image sensor of claim 1, wherein the single select block is coupled to both the first and second analog data buses.

9. An apparatus for converting image data into electric signals, the apparatus comprising:
- a pixel array including first and second pixels;
- a first analog data bus and a second analog data bus both configured to transfer first pixel data generated from the first pixel and second pixel data generated from the second pixel;

a first analog signal processor and a second analog signal processor;

a swapping block configured to swap the first pixel data and the second pixel data;

a correlated double-sampling block configured to sample and output pixel data generated from the first and second pixels in the pixel array;

a single select block configured to transfer the output signals of the correlated double-sampling block to the first analog data bus and the second analog data bus, wherein the single select block is further configured to transfer all pixel data generated from the first and second pixels; and a de-multiplexer configured to output the first pixel data and the second pixel data located at a first column in a regular sequence, and output the first pixel data and the second pixel data located at a second column in an opposite sequence.

10. The apparatus of claim 9, wherein the de-multiplexer is configured to output, in turns, the output data of the first analog signal processor and the second analog signal processor to only one output line, and further comprising:

an analog-to-digital converter block configured to convert the output data of the de-multiplexer into digital signals;

wherein the de-multiplexer is further configured to make a sequence of the pixel data swapped by the swapping block as a sequence of an original image in response to an input swap control signal.

11. The apparatus of claim 9, wherein the de-multiplexer is configured to output, in turns, the output data of the first analog signal processor and the second analog signal processor to only one output line, and further comprising:

an analog-to-digital converter block configured to convert the output data of the de-multiplexer to digital signals; and a re-swapping block configured to re-swap the output signals of the analog to digital converter block corresponding to the pixel data which is swapped by the swapping block.

12. The apparatus of claim 11, wherein the re-swapping block comprises:

a first flip-flop configured to output input signals synchronized with a clock;

a second flip-flop configured to output the output signals of the first flip-flop synchronized with another clock;

a first de-multiplexer configured to select between a first delay clock and a first swapping clock in response to a swap control signal to thereby provide the selected clock for the first flip-flop;

a second de-multiplexer configured to select between a second delay clock and a second swapping clock in response to the swap control signal to thereby provide the selected other clock for the second flip-flop;

a control signal-generating block configured to generate a control signal from the swap control signal and a pass control signal; and a third de-multiplexer configured to select between the input signals and the output signals of the second flip-flop in response to the control signal to thereby output the selected signal.

13. The apparatus of claim 9, wherein the single select block is coupled to both the first and second analog data buses.

14. A method for processing pixel data in an apparatus to convert image data into electrical signals, the apparatus including a plurality of first and second pixels, the method comprising:

receiving pixel data comprising first pixel data and second pixel data, wherein the first pixel data and the second pixel data corresponding to the respective first and second pixels of the apparatus;

transferring the pixel data to a first analog data bus and a second analog data bus via a single column select block, wherein the single column select block transfers all the pixel data generated from the first and second pixels;

swapping the first pixel data and the second pixel data to thereby deliver first and second swapped pixel data into first and second analog signal processors;

amplifying the pixel data delivered to the first and second analog signal processors; and de-multiplexing the amplified data, wherein during said de-multiplexing:

the first pixel data and the second pixel data located at a first column are output in a regular sequence; and the first pixel data and the second pixel data located at a second column are output in an opposite sequence.

15. The method of claim 14, wherein said swapping comprises:

passing pixel data transferred by the first analog data bus and the second analog data bus if the first pixel data is transferred by the second analog data bus; and swapping pixel data transferred by the first analog data bus and the second analog data bus if the first pixel data is transferred by the first analog data bus.

16. The method of claim 14, wherein each of the first pixels is configured to sense the green trait of light and each of the second pixels is configured to sense the red and blue traits of light.

17. The method of claim 14, wherein said de-multiplexing comprises de-multiplexing the amplified data in turns to output the amplified data to the one output line, wherein said de-multiplexing includes rearranging a sequence of the swapped pixel data as the sequence of an original image in response to a swap control signal, and further comprising converting the de-multiplexing data into digital signals.

18. The method of claim 14, wherein the first column is every even column and the second column is every odd column.

19. The method of claim 14, further comprising:

de-multiplexing the amplified data in turns to output the amplified data to the one output line;

converting the de-multiplexing data into digital signals; and re-swapping a sequence of the digital signals as the sequence of the pixel array in response to an inputted swap control signal.

20. The method of claim 19, wherein said re-swapping comprises:

holding the digital signals inputted at every odd number;

outputting the digital signals input at every even number; and outputting the held signals at every odd number.

21. The method of claim 14, wherein the single column select block is coupled to both the first and second analog data buses.

22. An apparatus, comprising:

a single select block configured to transfer output signals of a correlated double-sampling block to a first analog data bus and a second analog data bus in response to a column select signal, wherein the single select block is further configured to transfer pixel data generated from first and second pixels of a pixel array; and a de-multiplexer configured to output first pixel data and second pixel data located at a first column in a regular sequence, and output the first pixel data and the second pixel data located at a second column in an opposite sequence.

23. The apparatus of claim 22, wherein the apparatus is a complementary metal-oxide semiconductor (CMOS) image sensor.

24. The apparatus of claim 22, further comprising a first analog signal processor and a second analog signal processor both configured to amplify input pixel data to extract pure pixel data.

25. The apparatus of claim 24, further comprising a swapping block configured to swap the first pixel data and the second pixel data to thereby deliver first and second swapped pixel data into the first and the second analog signal processors.

26. The apparatus of claim 25, wherein the swapping block is further configured to, pass pixel data transferred by the first analog data bus and the second analog data bus if the first pixel data is transferred by the second analog data bus; and swap pixel data transferred by the first analog data bus and the second analog data bus if the first pixel data is transferred by the first analog data bus.

27. The apparatus of claim 22, further comprising a column driver configured to generate the column select signal.

28. The apparatus of claim 22, wherein the first pixel is configured to sense the green trait of light and the second pixel is configured to sense the red and blue traits of light.

29. The apparatus of claim 22, wherein the first pixel is configured to sense at least one of brightness, luminance, or chroma traits of light, and wherein the second pixel is configured to sense at least one other of brightness, luminance, or chroma traits of light.

30. The apparatus of claim 22, wherein the de-multiplexer is configured to output, in turns, output data of a first analog signal processor and a second analog signal processor to only one output line, and further comprising:

an analog-to-digital converter block configured to convert the output data of the de-multiplexer into digital signals;

wherein the de-multiplexer is further configured to make a sequence of pixel data swapped by a swapping block as a sequence of an original image in response to an input swap control signal.

31. The apparatus of claim 22, wherein the de-multiplexer is configured to output, in turns, output data of a first analog signal processor and a second analog signal processor to only one output line, and further comprising:

an analog-to-digital converter block configured to convert the output data of the de-multiplexer into digital signals;

and a re-swapping block configured to re-swap the output signals of the analog-to-digital converter block corresponding to the pixel data which is swapped by the swapping block.

32. The apparatus of claim 31, wherein the re-swapping block comprises:

a first flip-flop configured to output input signals synchronized with a clock;

a second flip-flop configured to output the output signals of the first flip-flop synchronized with another clock;

a first de-multiplexer configured to select between a first delay clock and a first swapping clock in response to a swap control signal to thereby provide the selected clock for the first flip-flop;

a second de-multiplexer configured to select between a second delay clock and a second swapping clock in response to the swap control signal to thereby provide the selected other clock for the second flip-flop;

a control signal-generating block configured to generate a control signal from the swap control signal and a pass control signal; and a third de-multiplexer configured to select between the input signals and the output signals of the second flip-flop in response to the control signal to thereby output the selected signal.

33. A method for processing pixel data, the method comprising:

transferring, via a single select block, output signals of a correlated double sampling block to a first analog data bus and a second analog data bus in response to a column select signal, transferring, via the single select block, pixel data generated from a plurality of first and second pixels of a pixel array;

outputting, via a de-multiplexer, first pixel data and second pixel data located at a first column in a regular sequence; and outputting, via the de-multiplexer, the first pixel data and the second pixel data located at a second column in an opposite sequence.

34. The method of claim 33, further comprising amplifying input pixel data to extract pure pixel data.

35. The method of claim 34, further comprising swapping the first pixel data and the second pixel data.

36. The apparatus of claim 35, further comprising passing pixel data transferred by the first analog data bus and the second analog data bus if the first pixel data is transferred by the second analog data bus; and swapping pixel data transferred by the first analog data bus and the second analog data bus if the first pixel data is transferred by the first analog data bus.

* * * * *

UNITED STATES PATENT AND TRADEMARK OFFICE

CERTIFICATE OF CORRECTION

PATENT NO. : 7,948,544 B2
APPLICATION NO. : 11/217240
DATED : May 24, 2011
INVENTOR(S) : Park et al.

It is certified that error appears in the above-identified patent and that said Letters Patent is hereby corrected as shown below:

Column 14, line 45, in Claim 36, delete "apparatus" and insert -- method --.

Signed and Sealed this
Fourteenth Day of August, 2012

David J. Kappos
*Director of the United States Patent and Trademark Office*